United States Patent
Callaghan

(10) Patent No.: US 10,225,129 B2
(45) Date of Patent: Mar. 5, 2019

(54) METHOD AND APPARATUS FOR THE EXTRICATION OF QUADRATURE PAIRS OF AMPLITUDE MODULATED SIGNALS FROM INTERMINGLED EXTRANEOUS SIGNALS

(71) Applicant: Edward P. Callaghan, New Hyde Park, NY (US)

(72) Inventor: Edward P. Callaghan, New Hyde Park, NY (US)

( * ) Notice: Subject to any disclaimer, the term of this patent is extended or adjusted under 35 U.S.C. 154(b) by 0 days.

(21) Appl. No.: 15/474,329

(22) Filed: Mar. 30, 2017

(65) Prior Publication Data

US 2018/0287847 A1    Oct. 4, 2018

(51) Int. Cl.
| | |
|---|---|
| *H04L 27/38* | (2006.01) |
| *H04L 27/26* | (2006.01) |
| *H04L 27/34* | (2006.01) |

(52) U.S. Cl.
CPC ........ *H04L 27/389* (2013.01); *H04L 27/2649* (2013.01); *H04L 27/2698* (2013.01); *H04L 27/345* (2013.01)

(58) Field of Classification Search
CPC ........ H03D 3/009; H03D 7/163; H03H 11/04; H04L 27/389; H04L 27/345; H04L 27/2649; H04L 27/2698
See application file for complete search history.

(56) References Cited

U.S. PATENT DOCUMENTS

| | | | | |
|---|---|---|---|---|
| 6,631,170 B1 * | 10/2003 | Gu | ........................ | H04B 1/0003 375/316 |
| 7,098,967 B2 * | 8/2006 | Kanno | .................... | H03D 7/165 348/641 |

* cited by examiner

*Primary Examiner* — Vineeta Panwalkar
(74) *Attorney, Agent, or Firm* — Whiteford, Taylor & Preston, LLP; Peter J. Davis

(57) ABSTRACT

Signal extrication of a pair of quadrature amplitude modulated signals of a particular carrier frequency and phase constant by equally splitting all input signals into two independent circuit paths that contain identical components but one independent circuit path performs a complementary signal processing function with respect to the other resulting in a counterbalance between the two paths, canceling all output signals with the exception of said pair of quadrature amplitude modulated signals which are not canceled because of the singular signal nullification property of a product detector circuit that is a component in each of said independent circuit paths.

18 Claims, 5 Drawing Sheets

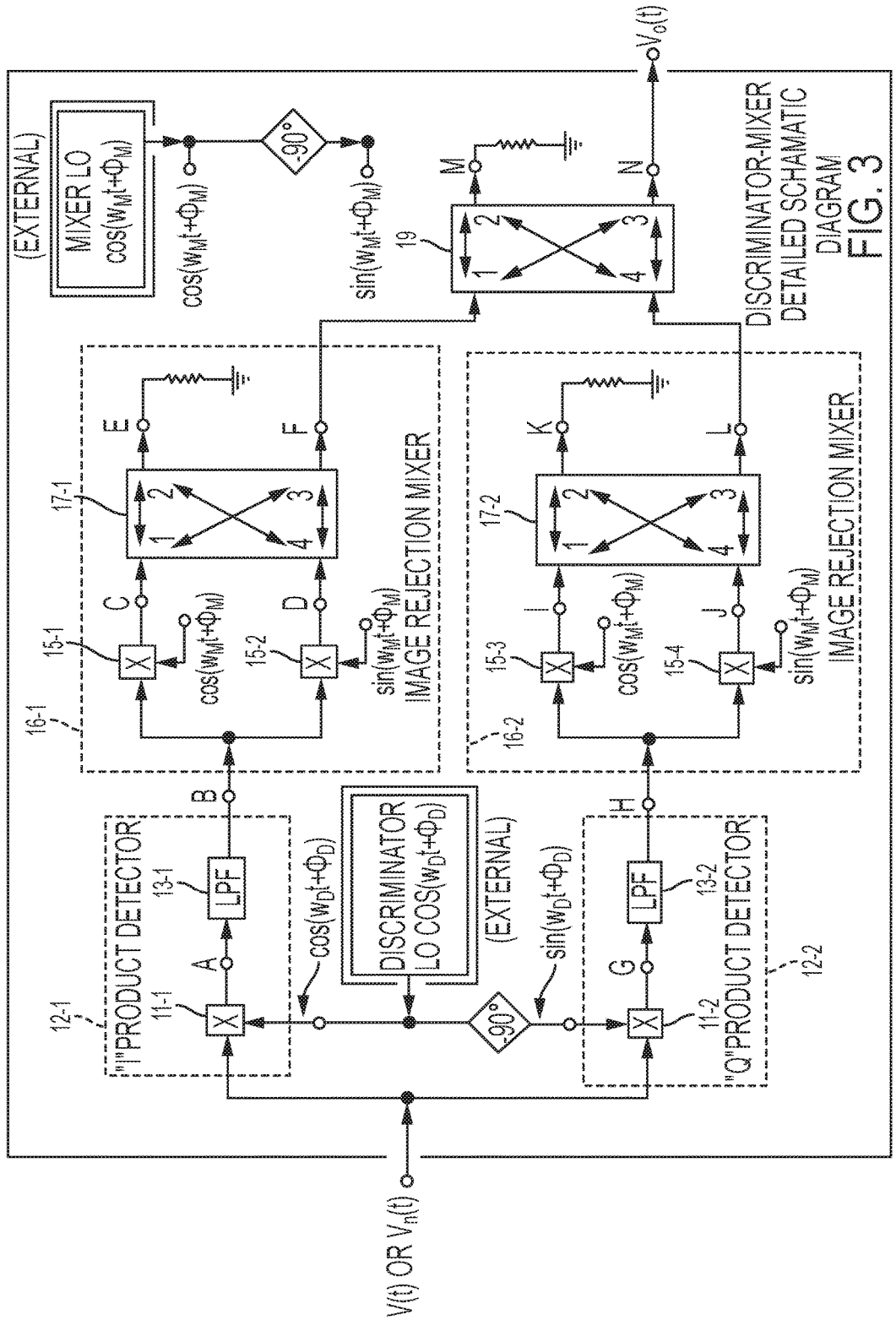

BASIC REPRESENTATION OF A 90° HYBRID COUPLER
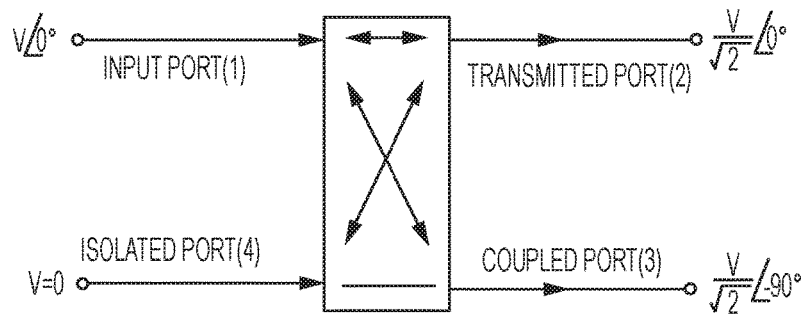
FIG. 4(a)
SYMBOL OF A 90° HYBRID COUPLER
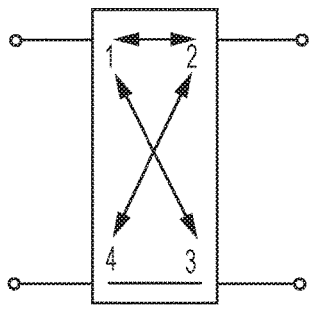
FIG. 4(b)
TRUTH TABLE
| INPUT PORT $V\angle 0°$ | OUTPUT PORT | | | |
| --- | --- | --- | --- | --- |
| | 1 | 2 | 3 | 4 |
| 1 | - | $V/\sqrt{2}\angle 0°$ | $V/\sqrt{2}\angle -90°$ | 0 |
| 2 | $V/\sqrt{2}\angle 0°$ | - | 0 | $V/\sqrt{2}\angle -90°$ |
| 3 | $V/\sqrt{2}\angle -90°$ | 0 | - | $V/\sqrt{2}\angle 0°$ |
| 4 | 0 | $V/\sqrt{2}\angle -90°$ | $V/\sqrt{2}\angle 0°$ | - |
FIG. 4(c)

TABLE 1

| SIGNAL PATH | PRODUCT DETECTOR OUTPUT | $V_N(t)$ at Point N | COMBINE $V_N(t)$ FROM "I" & "Q" SIGNAL |
|---|---|---|---|
| | | $V(t) = A_n(t) \cos(w_n t + \phi_n)$ | |
| "I" | $V_B(t) = (1/2) A_n(t) \cos[(w_n - w_D)t + (\phi_n - \phi_D)]$ | $(w_n t + \phi_n) \neq (w_D t + \phi_D)$ $-(1/4) A_n(t) \cos[(w_n - w_D + w_M)t + (\phi_n - \phi_D + \phi_M)]$ | $V_O(t) = 0$ |
| "Q" | $V_H(t) = -(1/2) A_n(t) \sin[(w_n - w_D)t + (\phi_n - \phi_D)]$ | $(1/4) A_n(t) \cos[(w_n - w_D + w_M)t + (\phi_n - \phi_D + \phi_M)]$ | |
| "I" | $V_B(t) = (1/2) A_n(t)$ | $(w_n t + \phi_n) = (w_D t + \phi_D)$ $= -(1/4) A_n(t) \cos(w_M t + \phi_M)$ | $V_O(t) = -(1/4) A_n(t) \cos(w_M t + \phi_M)$ |
| "Q" | $V_H(t) = 0$ | $= 0$ | |
| | | $V(t) = B_n(t) \sin(w_n t + \phi_n)$ | |
| "I" | $V_B(t) = (1/2) B_n(t) \sin[(w_n - w_D)t + (\phi_n - \phi_D)]$ | $(w_n t + \phi_n) \neq (w_D t + \phi_D)$ $-(1/4) B_n(t) \sin[(w_n - w_D + w_M)t + (\phi_n - \phi_D + \phi_M)]$ | $V_O(t) = 0$ |
| "Q" | $V_H(t) = (1/2) B_n(t) \cos[(w_n - w_D)t + (\phi_n - \phi_D)]$ | $(1/4) B_n(t) \sin[(w_n - w_D + w_M)t + (\phi_n - \phi_D + \phi_M)]$ | |
| "I" | $V_B(t) = 0$ | $(w_n t + \phi_n) = (w_D t + \phi_D)$ $= 0$ | $V_O(t) = (1/4) B_n(t) \sin(w_M t + \phi_M)$ |
| "Q" | $V_H(t) = (1/2) B_n(t)$ | $= (1/4) B_n(t) \sin(w_M t + \phi_M)$ | |

FIG. 5

METHOD AND APPARATUS FOR THE EXTRICATION OF QUADRATURE PAIRS OF AMPLITUDE MODULATED SIGNALS FROM INTERMINGLED EXTRANEOUS SIGNALS

BACKGROUND OF THE INVENTION

The norm today for the multiplexing of multiple modulated radio signals through a common transmission medium is that the signals' carriers and associated sidebands, as a result of the modulation, must stand alone within the frequency spectrum. There can be no interference from other modulated radio signals or the random intermingling of carriers and sidebands from non-descript signals containing sinusoidal components. Should this occur, the condition of the signals is considered to be inextricably intermingled and no selection of the signals for demodulation can be accomplished without suffering a distortion of the signal*.

The present state of the art requires that each of the signals must be separated so that its sidebands are not overlapping and that the transmission medium has, at least, a bandwidth equal to the sum of the bandwidths of the individual signals being sent. This bandwidth requirement has plagued the bandwidth reduction efforts that have been the target of intense efforts by scientists and engineers working in the telecommunications field. The selection of any one of these separated signals, for eventual demodulation, requires the use of a resonant filter that is designed to pass the particular range of frequencies occupied by the signal and suppresses all other signals at frequencies outside this range. The signals at these "other frequencies" cannot exist within the sidebands of the signal that is being demodulated to avoid distortion.

The instant invention actually eliminates the "stand alone" rule of a signal's spectrum in multiplexed systems. The overlapping of adjacent signal sidebands presents no problem for the instant invention in the extrication for the eventual demodulation of radio signals. The need for a resonant filter circuit for signal selection is not required, and it will be shown, that the unique use of the properties of the product detector circuit is all that is required to facilitate the signal selection process.

Amplitude modulation (AM) is the type of information-carrying signal that is widely used today for communications and is the type of signal associated with this invention. The instant invention selects, simultaneously, pairs of orthogonal AM signals which can be treated as two independent AM signals or as related AM signals thereby allowing the properties of the instant invention to apply to angular modulated signals which includes frequency modulation (FM) and phase modulated signals since the pair of AM signals are the resulting orthogonal components of frequency and phase modulated types of signals.

*There is one known multiplexing method that is an exception as regards to signal sideband intermingling to obtain bandwidth reduction and to increase spectral efficiency, and that is known as "Orthogonal Frequency Division Multiplexing" (OFDM). This method applies only to digital signals that must be generated by a digital signal processing technique and are not independent signals that are modulating independent carriers but a computer-generated subset of digital signals related to a digital main signal. These signals are computer generated to insure that the intermingled sidebands of the computer-generated subset of digital signals are mathematically orthogonal. A digital signal processor is required to generate the signals, their carriers and demodulate the signals. The instant invention requires no signal processors and uses independent digital, or non-digital, signals to modulate carriers of any frequency.

SUMMARY OF THE INVENTION

As a solution to these and other problems, the instant invention changes the rules of the juxtaposition of AM signals, as represented in the frequency spectrum realm, that apply to the present day norms, in both academic and commercial spheres of knowledge, of multiplex transmission system theories as a result of a strikingly important discovery associated with a unique radio signal-selecting apparatus identified as a discriminator-mixer circuit. The present day norms require the signal carriers to be properly spaced to insure that none of the individual signal sidebands are obscured in any way. However, the instant invention allows the sidebands of the transmitted AM signals to be obscured permitting its carrier and sidebands to overlap or be intermingled, in any random matter, with the carrier and sidebands of other signals. This allows an increase in the proximity of the signal carriers that greatly decreases the bandwidth requirements of the transmission medium and makes more efficient use of the available frequency spectrum. The key to this discovery involves a unique use of a signal processing singularity of the popular product detector that is used in the discriminator-mixer circuit to be described.

The invention and its mode of operation will be more fully understood from the following detailed description when taken with the appended drawings.

BRIEF DESCRIPTION OF THE DRAWINGS

FIG. 3 is a detailed schematic diagram of the discriminator-mixer;

FIG. 4(a) is a basic representation of a 90° hybrid coupler;

FIG. 4(b) is the symbol of a 90° hybrid coupler; and

FIG. 4(c) is a truth table for the 90° hybrid coupler.

FIG. 5 contains a review of the key equations in the analysis of the discriminator-mixer circuit according to an embodiment of the invention.

DETAILED DESCRIPTION

Figure 1:
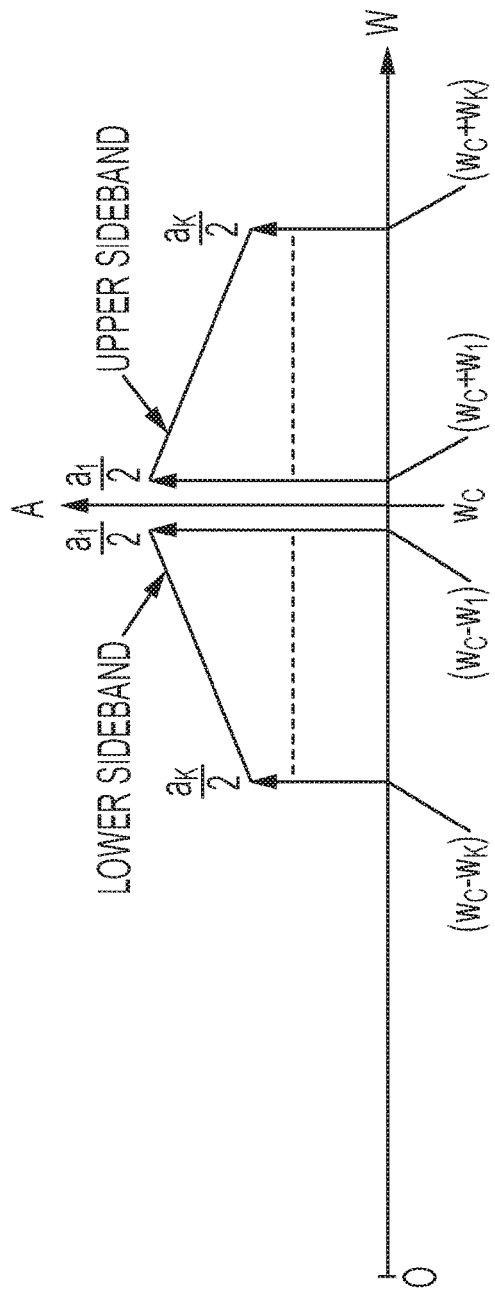
FIG. 1 is an amplitude modulated signal spectrum representation.

A discriminator-mixer circuit is described that is a receiver that simultaneously selects for demodulation a quadrature pair of AM signals that are intermingled with randomly spaced multiple AM signals and are being transmitted through a common medium (multiplexing) with sidebands that overlap. The overlapping of sidebands achieves a significant bandwidth reduction in multiplexed systems. Appendix A presents a simplified mathematical notation of typical AM signals and FIG. 1 presents the frequency spectrum representation of an AM signal. Both of these representations will be used throughout the description of the discriminator.

Figure 2A:
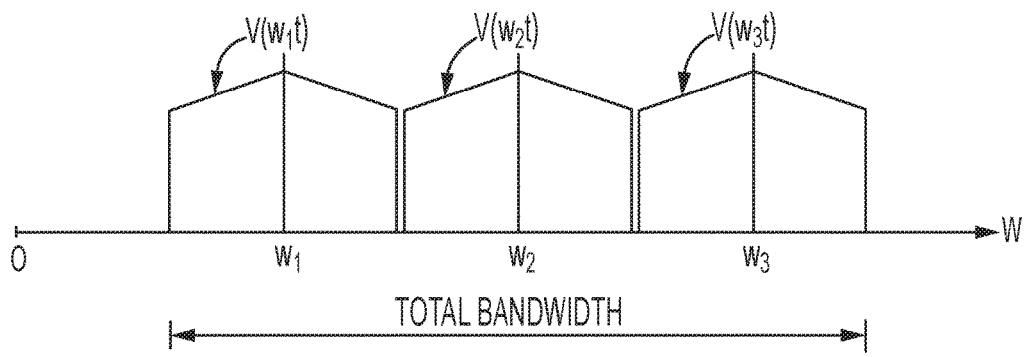
FIG. 2(a) is a typical spectrum representation of present day multiplexed amplitude modulated signals.
Figure 2B:
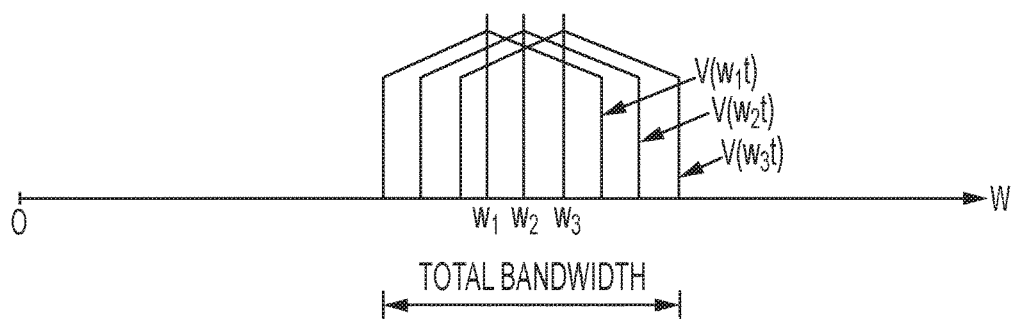
FIG. 2(b) is a multiplexed amplitude modulated signal spectrum representation of the instant invention.

A present day example of a multiplex transmission is shown in FIG. 2(a) that assumes three AM signals identified as $V(w_1 t)$, $V(w_2 t)$ and $V(w_3 t)$, as defined in Appendix A, where $w_1$, $w_2$ and $w_3$ are the carrier frequencies. The carrier frequencies have a separation that insures no overlapping of sidebands. This manner of transmission is required because of the radio receiver design limitations of presently known signal-selecting apparatus. The instant invention allows the AM signals to be transmitted with overlapping sidebands as shown in FIG. 2(b). By comparison, transmitting similar AM signals with overlapping sidebands results in a significant reduction in the overall bandwidth required for the transmission of these signals in the common medium.

To date, no apparatus for selecting AM signals for demodulation has been devised to produce a clear and undistorted reproduction of a transmitted information-carrying signal in an environment where the signals are intermingled to a condition that their sidebands are overlapping or obstructed in any way. On the contrary, the instant invention can select a desired AM signal under these conditions and allow demodulation without distortion, interference and loss of information. The object of the discriminator-mixer circuit, proposed by the instant invention, is to select for demodulation an AM signal of a particular carrier frequency and phase constant and suppress all other AM signals regardless of the proximity of their carriers. Appendix B provides the mathematical analyses of the discriminator-mixer circuit and establishes the validity of the assertions regarding the unique properties of the instant invention as well as the notation that is used throughout the detailed description.

FIG. 3 is a detailed schematic diagram of the discriminator-mixer circuit for the instant invention that illustrates the method and apparatus used to meet its objective. The input signal, V(t), is expressed as "N" multiple quadrature pairs of AM signals as described in Appendix A and written as:

$$V(t) = \sum_{1}^{N} [A_n(t)\cos(w_n t + \phi_n) + B_n(t)\sin(w_n t + \phi_n)]$$

$A_n(t)$ and $B_n(t)$ are the information-carrying modulating signal voltages associated with the $n^{th}$ intermingled quadrature pair of AM signals and $w_n$ and $\phi_n$ are the carrier frequency and phase constant respectively of each of the signals. Although the pair of signals have the same frequency and phase constant, they are totally independent signals and can be demodulated without any interference.

As described in Appendix B, all the circuit components illustrated in FIG. 3 are linear devices which allows the detailed description of the discriminator-mixer circuit to be analyzed using a single AM signal expressed as:

$$V_n(t) = A_n(t)\cos(w_n t + \phi_n),$$

where $V_n(t)$ is the $n^{th}$ AM signal contained in the input signal, V(t).

The use of appendixes serve as backup information to support the analysis in the main description of the instant invention, to unburden the dissertation of lengthy mathematical equations and to make it easily read. The detailed schematic of FIG. 3 shows the interconnection of five well-known radio frequency circuits, namely two identical product detectors 12-1 and 12-2, two identical image rejection mixers 16-1 and 16-2 and one 90° hybrid coupler 19. Also shown are two local oscillators (LO's) that produce single-tone signals of constant amplitude and frequency that are identified as the discriminator LO (DLO) and the mixer LO (MLO). These LO's are external signal sources and are not part of the discriminator-mixer circuit but are required for proper circuit operation.

The DLO provides a synchronized constant amplitude sinusoidal signal that defines a particular frequency and phase constant of a quadrature pair of AM signals that are desired to be selected for demodulation and is expressed as cos $(w_D t + \phi_D)$. The LO signal is split into two signals of the same frequency and phase constant but their phases are in quadrature, that is, they differ by 90° resulting in two signals, namely, cos $(w_D t + \phi_D)$ and sin $(w_D t + \phi_D)$. These two signals create an In-phase/Quadrature (I/Q) circuit configuration involving the two product detectors 12-1 and 12-2. The product detector 12-1 contains a multiplier 11-1 and a low-pass filter 13-1. Product detector 12-2 contains multiplier 11-2 and a low-pass filter 13-2. These product detectors make up the signal discriminator portion of the discriminator-mixer circuit. The product detector that receives the DLO's signal cos $(w_D t + \phi_D)$ is labeled the "I" product detector and the other that receives the DLO's signal sin $(w_D t + \phi_D)$ is labeled the "Q" product detector.

The single-tone output signal of the MLO is not synchronized and is used to supply the carrier for the discriminator-mixer's output signal. The MLO's signal is defined as cos $(w_M t + \phi_M)$ and is also split into two quadrature signals, namely, cos $(w_M t + \phi_M)$ and sin $(w_M t + \phi_M)$. The quadrature signals are utilized by the image rejection mixers 16-1 and 16-2. Image rejection mixer 16-1 contains two multipliers 15-1 and 15-2 and a 90° hybrid coupler 17-1 and image rejection mixer 16-2 contain two multipliers 15-3 and 15-4 and a 90° hybrid coupler 17-2. The quadrature signals supplied to the multipliers 15-1, 15-2, 15-3 and 15-4 contained in mixers 16-1 and 16-2 form an I/Q circuit and when connected to the hybrid couplers 17-1 and 17-2 make up standard image rejection circuits for any signal encountered from the product detectors 12-1 and 12-2.

There are two independent signal paths created that the input signal, $V_n(t)$, will take before becoming the output signal $V_o(t)$. The identity of the signal paths are defined by the identity of the product detector in each path. The "I" signal path for $V_n(t)$ is through the "I" product detector 12-1, image rejection mixer 16-1, the 90° hybrid coupler 19 and terminating at point N in FIG. 3. The "Q" signal path involves the "Q" product detector 12-2, image rejection mixer 16-2, the 90° hybrid coupler 19 and terminating at Point N. The signals from each path are combined at Point N resulting in the output signal $V_o(t)$. The 90° hybrid coupler 19, as discussed in Appendix C, is used for combining the signals from the "I" and the "Q" signal paths, providing isolation between the input signal ports (1 and 4) and also provides the −90° phase shift in the "I" signal path that is necessary to complete the signal processing.

The objective of the instant invention involves two functions that the discriminator-mixer circuit of FIG. 3 must perform. One function is to select a quadrature pair AM signals of carrier frequency, $w_n$, and phase constant, $\phi_n$, that has the same carrier frequency, $w_D$, and phase constant, $\phi_D$, of the synchronized discriminator LO (DLO) signal, that is, $w_n = w_D$ and $\phi_n = \phi_D$, and the other function is to suppress all other signals regardless of the proximity of their carrier frequencies to the selected AM signal's carrier frequency. These functions are performed by the transmittance of the "I" and the "Q" signal paths. With the AM signal expressed as:

$$V_n(t) = A_n(t)\cos(w_n t + \phi_n),$$

The transmittance of the "I" signal path provides a signal at Point N expressed in Appendix B as:

$$V_N(t) = -(¼)A_n(t)\cos[(w_n - w_D w_M)t + (\phi_n - \phi_D + \phi_M)]$$

and the transmittance of the "Q" signal path provides a signal at Point N also expressed as:

$$V_N(t)=(\tfrac{1}{4})A_n(t)\cos\,[(w_n-w_D+w_M)t+(\phi_n-\phi_D+\phi_M)],$$

that is equal to $V_n(t)$ from the "I" signal path but has an opposite polarity. Therefore, because of this counterbalance of equal AM signals, the output signal of the discriminator-mixer circuit is equal to zero, or a null. This is apparently the general solution over the discriminator-mixer circuit's operating bandwidth. However, referring to Appendix B, and this is the key to the unique signal selecting process, there is a singularity associated with the transmittance of the "Q" signal path. At Point H of FIG. 3, the output signal of the "Q" product detector 12-2 is expressed as:

$$V_H(t)=-(\tfrac{1}{2})A_n(t)\sin\,[(w_n-w_D)t(\phi_n-\phi_D)].$$

For the case where $w_n=w_D$ and $\phi_n=\phi_D$, then:

$$V_H(t)=0,$$

since:

$$\sin\,[(w_n-w_D)t+(\phi_n-\phi_D)]=0.$$

This singularity is not apparent in the mathematical expression of $V_N(t)$ that results from the transmittance of the "Q" signal path. The reality is, if $V_H(t)=0$, then $V_I(t)$, $V_J(t)$, $V_K(t)$, and $V_L(t)$ must also equal zero. Therefore the counterbalance of the "I" and "Q" signal paths do not exist when $w_n$ and $\phi_n$ of a particular AM signal is equal to $w_D$ and $\phi_D$ of the DLO signal. Consequently, the resulting output signal $V_O(t)$ is:

$$V_O(t)=-(\tfrac{1}{4})A_n(t)\cos(w_M t+\phi_M)$$

and not zero.

With the DLO's frequency, $w_D$, and the phase constant, $\phi_D$, and the MLO's frequency $w_M$ and phase constant, $\phi_M$, remaining the same, the analysis of the discriminator-mixer circuit for the quadrature signal of $V_n(t)=A_n(t)\cos\,(w_n t+\phi_n)$, namely:

$$V_n(t)=B_n(t)\sin(w_n t+\phi_n)$$

is readily obtained from the results shown in Appendix B since all the component parts indicated in FIG. 3 are linear devices. Using the identity:

$$\sin(w_n t+\phi_n)=\cos(w_n t+\phi_n-90°),$$

all that is required is to substitute $(\phi_n-90°)$ for $\phi_n$ in any equation of Appendix B.

For this case, the transmittance of the "I" signal path provides a signal at Point N as:

$$V_N(t)=-(\tfrac{1}{4})B_n(t)\sin\,[(w_n-w_D+w_M)t+(\phi_n-\phi_D+\phi_M)]$$

And the transmittance of the "Q" signal path the counterbalance signal at Point N expressed as:

$$V_N(t)=(\tfrac{1}{4})B_n(t)\sin\,[(w_n-w_D+w_M)t+(\phi_n-\phi_D+\phi_M)].$$

Again, there is a counterbalance of AM signals because they are equal but of opposite polarity and the output signal of the discriminator-mixer circuit is equal to zero.

In this case, the transmittance singularity occurs in the "I" signal path, instead of the "Q" signal path, when $w_n=w_D$ and $\phi_n=\phi_D$ since $V_B(t)$, in Appendix B, can be rewritten as:

$$V_B(t)=(1/2)B_n(t)\cos[(w_n-w_D)t+(\phi_n-\phi_D-90°)]$$

$$=(1/2)B_n(t)\sin[(w_n-w_D)t+(\phi_n-\phi_D)]$$

$$=0$$

With $V_B(t)=0$, then, $V_C(t)$, $V_D(t)$, $V_E(t)$, and $V_F(t)$ are equal to zero; consequently, the counterbalance of the signals in the "I" and "Q" signal paths do not exist and:

$$V_O(t)=(1/4)B_n(t)\cos(w_M t+\phi_M-90°)$$

$$=(1/4)B_n(t)\sin(w_M t+\phi_M)$$

and not zero.

A review of the key equations in the analysis of the discriminator-mixer circuit is displayed in FIG. 5. In summation, if the input signals to the discriminator-mixer circuit are pairs of quadrature AM signals, that is:

$$V(t)=\sum_1^N V_n(t)=\sum_1^N [A_n(t)\cos(w_n t+\phi_n)+B_n(t)\sin(w_n t+\phi_n)],$$

then the output signals are all suppressed, that is:

$$V_O(t)=0$$

for $w_n\neq w_D$. However, for $w_n=w_D$, then:

$$V_O(t)=-(\tfrac{1}{4})An(t)\cos(w_n t+\phi_n)+(\tfrac{1}{4})B_n(t)\sin(w_n t+\phi_n)$$

and these orthogonal output signals can be independently demodulated.

There are other salient features of the instant invention. First, there are construction options regarding the 90° hybrid couplers, 17-1, 17-2 and 19. Since the mixer frequency, $w_M$, is arbitrary, the operating frequencies of the couplers can be selected that will allow the couplers to be optimally designed for bandwidth, type of circuitry and physical size regardless of the frequency of the input signals to the discriminator-mixer circuit. Second, the discriminator-mixer circuit can be simplified by selecting the MLO's frequency and phase constant to be the same as the DLO's frequency and phase constant thereby utilizing the available external DLO and eliminating the external MLO. Third, the instant invention has the ability to select pairs of quadrature AM signals simultaneously, therefore any pair can represent an angular modulated signal, which includes frequency modulated (FM) and phase modulated signals.

The multipliers, hybrid couplers, low-pass filters (LPFs), etc., shown in the drawings are all well known standard circuit components and can take many forms or designs and per se form no part of the claimed invention. One skilled in the art may make various changes and substitutions for these components without departing from the spirit and scope of the invention. The methods for the synchronization of the DLO signal, $\cos\,(w_D t+\phi_n)$, are well established for multiplexed signal systems design and need not be discussed.

APPENDIX A

SIMPLIFIED NOTATION OF AMPLITUDE MODULATED SIGNALS INCLUDING SPECTRUM REPRESENTATION

For the analysis of the instant invention, amplitude modulation (AM) information carrying signal, $V(t)$, will be mathematically expressed as:

$$V(t) = A(t) \cos(w_c t + \phi_c),$$

where:

$V(t)$ = AM information carrying signal, $A(t)$ = Modulation voltage, $\cos(w_c t)$ = Sinusoidal carrier voltage, and $w_c$ = Angular frequency of the carrier (radians/sec.) = $2\pi f$, $f$ = frequency of the carrier (cycles/sec.), $\phi_c$ = Phase constant of the carrier.

The modulating voltage, $A(t)$, is expressed as:

$$A(t) = A + v(t),$$

where:

$A$ = Amplitude of the non-modulated carrier, and $v(t)$ = Modulation voltage of the signal representing the information.

The modulation voltage, $v(t)$, can be represented as a sum of sinusoidal voltages as:

$$v(t) = \sum_{1}^{K} a_k \cos(w_k t + \phi_k),$$

where $w_k$ is the angular frequency of the $k^{th}$ sinusoidal voltage of the modulating signal and $\phi_k$ is the constant part of its phase. The modulating voltage, v(t), modulates the sinusoidal carrier, that is:

$$v(t) \cos(w_c t),$$

and since amplitude modulation is a linear process their results a pair of sideband frequencies ( $w_c + w_k$ ) and ($w_c - w_k$ ) that are symmetrically located about the carrier frequency, $w_c$. FIG.1 is the frequency spectrum representation of an AM signal with a carrier that is modulated by the information signal A(t).

APPENDIX B

DETAILED ANALYSIS OF THE AM SIGNAL DISCRIMINATOR-MIXER

FIG. 3 is used for the mathematical analysis of the instant invention. The input and output of the discriminator-mixer is represented as V(t) and $V_o(t)$ respectively. The input signal, V(t), is assumed to consist of many AM information-carrying signals where only one is desired to be selected by the discriminator and may also consist of non-descript signals containing sinusoidal components and single-tone synchronization signals, all of which, that can be described as AM signals. Therefore, V(t) is generally represented as:

$$V(t) = \sum_1^N V_n(t) = \sum_1^N A_n(t) \cos(w_n t + \phi_n).$$

The detailed mathematical description of an AM signal is described in Appendix A. All the component parts of the discriminator consists of linear circuits, therefore, a solution can be sought using a single AM signal described as:

$$V_n(t) = A_n(t) \cos(w_n t + \phi_n)$$

where $V_n(t)$ is the $n^{th}$ AM signal of the input signal. The response of the discriminator to multiple AM signals is the sum of the responses of each individual AM signal taken one at a time.

There are five input signals to the discriminator-mixer, namely:

(1) the input signal: $V_n(t) = A_n(t) \cos(w_n t + \phi_n)$, (2) a unit amplitude sinusoidal signal having the frequency and phase of the desired signal to be selected by the discriminator expressed as $\cos(w_D t + \phi_D)$, (3) the orthogonal unit amplitude sinusoidal signal of (2) expressed by the mathematical complement $\sin(w_D t + \phi_D)$, (4) the optional selection of frequency and phase of the unity amplitude sinusoidal signal of the mixer LO expressed as: $\cos(w_M t + \phi_M)$ and (5) the orthogonal unit amplitude signal of (4) expressed by the mathematical compliment: $\sin(w_M t + \phi_M)$.

With $V_n(t)$ as the input signal to the discriminator–mixer of Fig.3, Point A is the output of multiplier 11-1 and the signal is expressed as:

$$V_A(t) = V_n(t)\cos(w_D t + \phi_D)$$

$$= A_n(t)\cos(w_n t + \phi_n)\cos(w_D t + \phi_D)$$

$$= (1/2)A_n(t)\cos[(w_n + w_D)t + (\phi_n + \phi_D)]$$

$$+ (1/2)A_n(t)\cos[(w_n - w_D)t + (\phi_n - \phi_D)]$$

and $V_A(t)$ is the input signal to the lowpass filter (LPF) 13-1.

The lowpass filter (LPF) 13-1 is designed to suppress the high frequency component of $V_A(t)$, namely: $(1/2)A(t)\cos[(w_n + w_D)t + (\phi_n + \phi_D)]$.

Point B has the remaining signal, namely:

$$V_B(t) = (1/2)A_n(t)\cos[(w_n - w_D)t + (\phi_n - \phi_D)],$$

and is the input signal to multipliers 15-1 and 15-2.

Point C is the output of multiplier 15-1 and the signal is expressed as:

$$V_C(t) = V_B(t)\cos(w_M t + \phi_M)$$

$$= (1/2)A_n(t)\cos[(w_n - w_D)t + (\phi_n - \phi_D)]\cos(w_M t + \phi_M)$$

$$= (1/4)A_n(t)\{\cos[(w_n - w_D - w_M)t + (\phi_n - \phi_D - \phi_M)]$$

$$+ \cos[(w_n - w_D + w_M)t + (\phi_n - \phi_S + \phi_M)]\},$$

where "$w_M$" is the desired mixer signal frequency of choice.

Point D is output of multiplier 15-2 and the signal is expressed as:

$$V_D(t) = V_B(t) \sin(w_M t + \phi_M)$$

$$= (1/2) A_n(t) \cos[(w_n - w_D)t + (\phi_n - \phi_D)] \sin(w_M t + \phi_M)$$

$$= (1/4) A_n(t) \{ \sin[(w_n - w_D + w_M)t + (\phi_n - \phi_D + \phi_M)]$$

$$- \sin[(w_n - w_D - w_M)t + (\phi_n - \phi_D - \phi_M)] \}.$$

$V_C(t)$ and $V_D(t)$ are the input signals to the 90° hybrid coupler 17-1. As discussed in Appendix C, $V_C(t)$ will appear at Point E with no phase shift but reduced in amplitude by $1/\sqrt{2}$ and also appear at Point F phase shifted by $-90°$ and reduced in amplitude by $1/\sqrt{2}$. Conversely, $V_D(t)$ will appear at Point F with no phase shift with its amplitude reduced by $1/\sqrt{2}$ and appear at Point E phase shifted by $-90°$ and reduced in amplitude by $1/\sqrt{2}$.

Point E therefore has the signal;

$$V_E(t) = (1/\sqrt{2})V_C(t) + \langle (1/\sqrt{2})V_D(t) \rangle \angle -90°$$

$$= (1/4\sqrt{2}) A_n(t)\{ \cos[(w_n - w_D - w_M)t + (\phi_n - \phi_D - \phi_M)]$$

$$+ \cos[(w_n - w_D + w_M)t + (\phi_n - \phi_D + \phi_M)]$$

$$+ \langle \sin[(w_n - w_D + w_M)t + (\phi_n - \phi_D + \phi_M] \rangle \angle -90°$$

$$- \langle \sin[(w_n - w_D - w_M)t + (\phi_n - \phi_D - \phi_M) \rangle \angle -90°\}$$

$$= (1/4\sqrt{2}) A_n(t)\{ \cos[(w_n - w_D - w_M)t + (\phi_n - \phi_D - \phi_M)]$$

$$+ \cos[(w_n - w_D + w_M)t + (\phi_n - \phi_D + \phi_M)]$$

$$- \cos[(w_n - w_D + w_M)t + (\phi_n - \phi_D + \phi_M)]$$

$$+ \cos[(w_n - w_D - w_M)t + (\phi_n - \phi_D - \phi_M)] \}$$

$$= (1/2\sqrt{2})A_n(t) \cos[(w_n - w_D - w_M)t + (\phi_n - \phi_D - \phi_M)].$$

Point F has the signal;

$$V_F(t) = (1/\sqrt{2}) V_D(t) + \langle (1/\sqrt{2}) V_C(t) \rangle \angle -90°$$

$$= (1/4\sqrt{2}) A_n(t) \{ \sin[(w_n - w_D + w_M)t + (\phi_n - \phi_D + \phi_M)]$$

$$- \sin[(w_n - w_D - w_M)t + (\phi_n - \phi_D - \phi_M)]$$

$$+ \langle \cos[(w_n - w_D - w_M)t + (\phi_n - \phi_D - \phi_M] \rangle \angle -90°$$

$$+ \langle \cos[(w_n - w_D + w_M)t + (\phi_n - \phi_D + \phi_M] \rangle \angle -90° \}$$

$$= (1/4\sqrt{2}) A_n(t) \{ \sin[(w_n - w_D + w_M)t + (\phi_n - \phi_D + \phi_M)]$$

$$- \sin[(w_n - w_D - w_M)t + (\phi_n - \phi_D - \phi_M)]$$

$$+ \sin[(w_n - w_D - w_M)t + (\phi_n - \phi_D - \phi_M)$$

$$+ \sin[(w_n - w_D + w_M)t + (\phi_n - \phi_D + \phi_M)] \}$$

$$= (1/2\sqrt{2}) A_n(t) \sin[(w_n - w_D + w_M)t + (\phi_n - \phi_D + \phi_M)].$$

Point G is the output of multiplier 11-2 and the signal is expressed as:

$$V_G(t) = V_n(t) \sin(w_D t + \phi_D)$$

$$= A_n(t) \cos(w_n t + \phi_n) \sin(w_D t + \phi_D)$$

$$= (1/2) A_n(t) \sin[(w_n + w_D)t + (\phi_n + \phi_D)]$$

$$- (1/2) A_n(t) \sin[(w_n - w_D)t + (\phi_n - \phi_D)]$$

and $V_G(t)$ is the input signal to the LPF 13-2.

Point H is the output of the LPF 13-2 and the signal is expressed as:

$$V_H(t) = -(1/2) A_n(t) \sin[(w_n - w_D)t + (\phi_n - \phi_D)].$$

$V_H(t)$ is the input to the multipliers 15-3 and 15-4.

Point I is the output of multiplier 15-3 and the signal is expressed as:

$$V_I(t) = V_H(t) \cos(w_M t + \phi_M)$$

$$= -(1/2) A_n(t) \sin[(w_n - w_D)t + (\phi_n - \phi_D)] \cos(w_M t + \phi_M)$$

$$= -(1/4) A_n(t) \{ \sin[(w_n - w_D + w_M)t + (\phi_n - \phi_D + \phi_M)]$$

$$+ \sin[(w_n - w_D - w_M)t + (\phi_n - \phi_D - \phi_M)] \}.$$

Point J is the output of multiplier 15-4 and the signal is expressed as:

$$V_J(t) = V_H(t) \sin(w_M t + \phi_M)$$

$$= -(1/2) A_n(t) \sin[(w_n - w_D)t + (\phi_n - \phi_D)] \sin(w_M t + \phi_M)$$

$$= (1/4) A_n(t) \{ -\cos[(w_n - w_D - w_M)t + (\phi_n - \phi_D - \phi_M)]$$

$$+ \cos[(w_n - w_D + w_M)t + (\phi_N - \phi_S + \phi_M)] \}.$$

$V_I(t)$ and $V_J(t)$ are the input signals to the 90° hybrid coupler 17-2.

Point K has the signal:

$$V_K(t) = (1/\sqrt{2}) V_I(t) + \langle (1/\sqrt{2}) V_J(t) \rangle \angle -90°$$

$$= (1/4\sqrt{2}) A_n(t) \{ -\sin[(w_n - w_D + w_M)t + (\phi_n - \phi_D + \phi_M)]$$

$$- \sin[(w_n - w_D - w_M)t + (\phi_n - \phi_D - \phi_M)]$$

$$- \langle \cos[(w_n - w_D - w_M)t + (\phi_n - \phi_D - \phi_M)] \rangle \angle -90°$$

$$+ \langle \cos[(w_n - w_D + w_M)t + (\phi_n - \phi_D + \phi_M)] \rangle \angle -90° \}$$

$$= (1/4\sqrt{2}) A_n(t) \{ -\sin[(w_n - w_D + w_M)t + (\phi_n - \phi_D + \phi_M)]$$

$$- \sin[(w_n - w_D - w_M)t + (\phi_n - \phi_D - \phi_M)]$$

$$- \sin[(w_n - w_D - w_M)t + (\phi_n - \phi_D - \phi_M)]$$

$$+ \sin[(w_n - w_D + w_M)t + (\phi_n - \phi_D + \phi_M)] \}$$

$$= -(1/2\sqrt{2}) A_n(t) \sin[(w_n - w_D - w_M)t + (\phi_n - \phi_D - \phi_M)].$$

Point L has the signal:

$$V_L(t) = (1/\sqrt{2}) V_J(t) + \langle (1/\sqrt{2}) V_I(t) \rangle \angle -90°$$

$$= (1/4\sqrt{2}) A_n(t) \{ -\cos[(w_n - w_D - w_M)t + (\phi_n - \phi_D - \phi_M)]$$

$$+ \cos[(w_n - w_D + w_M)t + (\phi_n - \phi_D + \phi_M)]$$

$$- \langle \sin[(w_n - w_D + w_M)t + (\phi_n - \phi_D + \phi_M)] \rangle \angle -90°$$

$$-\langle \sin[(w_n - w_D - w_M)t + (\phi_n - \phi_D - \phi_M)] \rangle \angle -90° \}$$

$$= (1/4\sqrt{2}) A_n(t) \{ -\cos[(w_n - w_D - w_M)t + (\phi_n - \phi_D - \phi_M)]$$

$$+ \cos[(w_n - w_D + w_M)t + (\phi_n - \phi_D + \phi_M)]$$

$$+ \cos[(w_n - w_D + w_M)t + (\phi_n - \phi_D + \phi_M)]$$

$$+ \cos[(w_n - w_D - w_M)t + (\phi_n - \phi_D - \phi_M)] \}$$

$$= (1/2\sqrt{2}) A_n(t) \cos[(w_n - w_D + w_M)t + (\phi_n - \phi_D + \phi_M)].$$

$V_F(t)$ and $V_L(t)$ are the input signals to the 90° hybrid coupler 19.

Point M has the signal:

$$V_M(t) = (1/\sqrt{2}) V_F(t) + \langle (1/\sqrt{2}) V_L(t) \rangle \angle -90°$$

$$= (1/4) A(t)_n \sin[(w_n - w_D + w_M)t + (\phi_n - \phi_D + \phi_M)]$$

$$+ \langle (1/4) A_n(t) \cos[(w_n - w_D + w_M)t + (\phi_n - \phi_D + \phi_M)] \rangle \angle -90°$$

$$= (1/4) A_n(t) \sin[(w_n - w_D + w_M)t + (\phi_n - \phi_D + \phi_M)]$$

$$+ (1/4) A_n(t) \sin[(w_n - w_D + w_M)t + (\phi_n - \phi_D + \phi_M)]$$

$$= (1/2) A_n(t) \sin[(w_n - w_D + w_M)t + (\phi_n - \phi_D + \phi_M)].$$

Point N has the signal:

$$V_N(t) = (1/\sqrt{2}) V_L(t) + \langle (1/\sqrt{2}) V_F(t) \rangle \angle -90°$$

$$= (1/4) A_n(t) \cos[(w_n - w_D + w_M)t + (\phi_n - \phi_D + \phi_M)]$$

$$+ \langle (1/4) A_n(t) \sin[(w_n - w_D + w_M)t + (\phi_n - \phi_D + \phi_M)] \rangle \angle -90°$$

$$= (1/4) A_n(t) \cos[(w_n - w_D + w_M)t + (\phi_n - \phi_D + \phi_M)]$$

$$- (1/4) A_n(t) \cos[(w_n - w_D + w_M)t + (\phi_n - \phi_D + \phi_M)]$$

$$= 0.$$

APPENDIX C

90° HYBRID COUPLER REPRESENTATION

A 90° hybrid coupler is a very well known and popular four-port device that is used either to equally split an input signal with a resultant 90° phase shift between output ports or to combine two signals while maintaining high signal isolation between the ports. The basic representation of the hybrid coupler is shown in FIG.4(a). The actual physical construction and port positions can vary depending upon the frequency of operation and the design. What is represented here is given to clarify the mathematical process that is utilized in the present invention. The symbol that will be used in the schematics is defined in FIG.4(b).

Referring to FIG. 4(a), if an AM signal is the input signal to the hybrid coupler at Port (1), part of the AM signal goes to the transmitted Port (2) and is reduced in amplitude by $1/\sqrt{2}$ but experiences no phase shift. Another part of the AM signal is transmitted to coupled Port (3) and is reduced in amplitude by $1/\sqrt{2}$ and experiences a 90° phase delay.

The 90° hybrid coupler is also known as a quadrature hybrid because a signal applied to any input port, will result in two equal amplitude signals that are quadrant (90° apart). It also makes no difference which port is the input because the relationships at the output ports remains as these devices are electrically and mechanically symmetrical. This configuration ensures a high degree of isolation between the two output ports and the two input ports without unwanted interaction between them. The truth table of FIG. 4(c) shows the relationship between an input port and the output port's signals.

The invention claimed is:

1. A discriminator-mixer circuit that selects for demodulation only a desired pair of quadrature amplitude modulated (AM) signals, $A_D(t) \cos(w_D t + \phi_D)$ and $B_D(t) \sin(w_D t + \phi_D)$, of a particular carrier frequency $w_D$ and phase constant $\phi_D$ contained in an input signal to the discriminator-mixer circuit which also contains intermingled extraneous AM signals having different carrier frequencies and phase constants from said particular carrier frequency and phase constant, said circuit comprising:
   (a) a signal splitter configured to split said input signal into two signals, designated the "I" signal and the "Q" signal and having signal paths designated as the "I" signal path and the "Q" signal path, respectively,
   (b) said "I" signal path comprising:
      an "I" signal path product detector including
         a first "I" signal path multiplier and
         an "I" signal path low pass filter,
      an "I" signal path image rejection mixer including
         an "I" signal path image rejection mixer signal splitter,
         second and third "I" signal path multipliers, and
         an "I" signal path 90° hybrid coupler, Port 1 and Port 4 of said "I" signal path 90° hybrid coupler terminating at Port 3 of the "I" signal path 90° hybrid coupler,
   (c) said "Q" signal path comprising:
      a "Q" signal path product detector including
         a first "Q" signal path multiplier and
         a "Q" signal path low pass filter,
      a "Q" signal path image rejection mixer including
         a "Q" signal path image rejection mixer signal splitter,
         second and third "Q" signal path multipliers, and
         a "Q" signal path 90° hybrid coupler, Port 1 and Port 4 of said "Q" signal path 90° hybrid coupler terminating at said Port 3 of the "Q" signal path 90° hybrid coupler,
   (d) a terminal signal path 90° hybrid coupler configured to receive signals from Port 3 of said "I" signal path 90° hybrid coupler and from Port 3 of said "Q" signal path 90° hybrid coupler and combine them;
   (e) wherein said particular carrier frequency and phase constant of said desired pair of quadrature AM signals are defined by a discriminator local oscillator which generates a synchronized constant amplitude sinusoidal signal expressed as $\cos(w_D t + \phi_D)$ and corresponding to said particular carrier frequency $w_D$ and phase constant $\phi_D$,
   (f) wherein said first "I" signal path multiplier heterodynes said "I" signal from said signal splitter with said synchronized constant amplitude sinusoidal signal,
   (g) wherein said first "Q" signal path multiplier heterodynes said "Q" signal from said signal splitter with a signal expressed as $\sin(w_D t + \phi_D)$ having an identical frequency and phase constant as said synchronized constant amplitude sinusoidal signal, but phase shifted by 90°;
   (h) wherein said second "I" signal path multiplier heterodynes a signal expressed as $\cos(w_M t + \phi_M)$ of arbitrary frequency $w_M$ and phase constant $\phi_M$, said signal generated by a mixer local oscillator with a signal from said "I" signal path image rejection mixer signal splitter, and said third "I" signal path multiplier heterodynes a signal that is phase shifted 90° to said signal generated by said mixer local oscillator with said signal from said "I" signal path image rejection mixer signal splitter;
   (i) wherein said second "Q" signal path multiplier heterodynes said signal generated by a mixer local oscillator with a signal from said "Q" signal path image rejection mixer signal splitter and said third "Q" signal path multiplier heterodynes said signal that is phase shifted 90° to said signal generated by said mixer local oscillator with said signal from said "Q" signal path image rejection mixer signal splitter.

2. An apparatus for extricating a desired pair of quadrature amplitude modulated signals $A_D(t) \cos(w_D t + \phi_D)$ and $B_D(t) \sin(w_D t + \phi_D)$ of a particular frequency $w_D$ and phase constant $\phi_D$ from a high frequency input signal where said desired pair of quadrature amplitude modulated signals are intermingled with extraneous signals, said apparatus comprising:
   a signal splitter for splitting said high frequency input signal into an "I" signal path and a "Q" signal path where each of said "I" signal path and said "Q" signal path contains identical circuit components;
   said "I" signal path and said "Q" signal path each comprising:
      a product detector that down converts said high frequency input signal to a baseband output signal that includes zero frequency, and
      an image rejection mixer that up converts said baseband output signal to an arbitrary high frequency output signal of frequency $w_M$ and phase constant $\phi_M$, and
   said apparatus further comprising a hybrid coupler that is shared by said "I" signal path and said "Q" signal path that combines the arbitrary high frequency output signal from said image rejection mixers and adds a 90° phase delay to the output signal of the image rejection mixer in said "I" signal path.

3. The apparatus according to claim 2 wherein said particular frequency $w_D$ and phase constant $\phi_D$ is determined by an external discriminator local oscillator that generates an orthogonal pair of constant amplitude signals, $\cos(w_D t + \phi_D)$ and $\sin(w_D t + \phi_D)$, where said $\cos(w_D t + \phi_D)$ is one of said orthogonal signals and is the input signal to said product detector in said "I" signal path and where said $\sin(w_D t + \phi_D)$ is the other of said orthogonal signals and is the input signal to the product detector in said "Q" signal path.

4. The apparatus according to claim 2 wherein said arbitrary high frequency output signal is determined by an external mixer local oscillator that generates an orthogonal pair of constant amplitude signals, $\cos(w_M t + \phi_M)$ and $\sin(w_M t + \phi_M)$, that provide said mixer local oscillator input signals to said image rejection mixers in said "I" and "Q" signal paths.

5. A method for extricating a desired pair of quadrature amplitude modulated signals $A_D(t) \cos(w_D t + \phi_D)$ and $B_D(t) \sin(w_D t + \phi_D)$ of a particular frequency and phase constant from a high frequency input signal where said desired pair of quadrature amplitude modulated signals are intermingled with extraneous signals, the method comprising:
   splitting said high frequency input signal is split into an "I" signal path and a "Q" signal path where each path contains identical circuit components
   in each of said "I" signal path and said "Q" signal path, using a product detector to down convert said high frequency input signal to a baseband output signal that includes zero frequency, using an image rejection mixer to up convert said baseband output signal to an arbitrary high frequency output signal and using the said terminal path 90° hybrid coupler to combine the arbitrary high frequency output signal from each of said image rejection mixers and add a 90° phase delay to the output signal of the said image rejection mixer in said "I" signal path.

6. The method according to claim 5 wherein the signal processing by the product detector in said "I" signal path performs complimentary signal functions with respect to the product detector circuit in said "Q" signal path.

7. The method according to claim 5 wherein said particular frequency and phase constant is determined by an external discriminator local oscillator that generates an orthogonal pair of constant amplitude signals, $\cos(w_D t+\phi D)$ and $\sin(w_D t+\phi_D)$, where said $\cos(w_D t+\phi_D)$ is one of said orthogonal pair of constant amplitude signals and is an input signal to said product detector in said "I" signal path, and where said $\sin(w_D t+\phi_D)$ is a second of said orthogonal pair of constant amplitude signals and is an input signal to said product detector in said "Q" signal path.

8. The method according to claim 5 wherein said high frequency input signal in the "I" signal path is heterodyned by said product detector with a discriminator local oscillator's signal $\cos(w_D t+\phi_D)$ and said high frequency signal in the "Q" signal path is heterodyned by said product detector with said discriminator local oscillator's signal $\sin(w_D t+\phi_D)$.

9. The method according to claim 5 wherein said baseband output signal from each of the product detectors is up converted to said arbitrary high frequency signal by heterodyning with an orthogonal pair of constant amplitude signals from an external mixer local oscillator.

10. The method according to claim 5 wherein the output of said image rejection mixer in said "I" signal path is the input signal to said port 1 of said terminal signal path 90° hybrid coupler and the output of said image rejection mixer in said "Q" signal path is the input signal to port 4 of said terminal signal path 90° hybrid coupler and said input signals in said port 1 and said port 4 terminate at said port 3 of said terminal signal path 90° hybrid coupler.

11. The method according to claim 5 wherein the output signal of the image rejection mixer in said "I" signal path is the input signal to port 1 of said terminal signal path 90° hybrid coupler and experiences a 90° phase delay at port 3 of said terminal signal path 90° hybrid coupler and the output signal of the image rejection mixer in said "Q" signal path is the input signal to port 4 of said terminal signal path 90° hybrid coupler and does not experience any phase delay at the said port 3.

12. The method according to claim 5 wherein said extraneous signals that pass through said "I" and "Q" signal paths and terminate at port 3 of said terminal signal path 90° hybrid coupler are equal but of opposite polarity and thereby cancel each other.

13. The method according to claim 7 wherein the extricated said desired pair of quadrature amplitude modulated signals have a frequency and phase constant equal to the generated signal of said external discriminator local oscillator.

14. The method according to claim 5 wherein both signals of said pair of the desired quadrature pair of amplitude modulated signals are heterodyned by the product detector in each of said "I" signal path and said "Q" signal path.

15. The method according to claim 7 wherein one signal, $B_D(t)\sin(w_D t+\phi_D)$, of said pair of desired quadrature amplitude modulated signals is nullified by the product detector in said "I" signal path but not nullified in said "Q" signal path.

16. The method according to claim 7 wherein one signal, $A_D(t)\cos(w_D t+\phi_D)$, of the said pair of desired quadrature amplitude modulated signals is nullified by the product detector in said "Q" signal path but is not nullified in said "I" signal path.

17. The method according to claim 7 wherein said desired quadrature amplitude modulated signal $B_D(t)\sin(w_D t+\phi_D)$ that is not nullified in said "Q" signal path appears at port 3 of said hybrid coupler.

18. The method according to claim 7 wherein said desired quadrature amplitude modulated signal $A_D(t)\cos(w_D t+\phi_D)$ that is not nullified in said "I" signal path appears with an opposite polarity at port 3 of said hybrid coupler.

* * * * *